3,174,848
PROCESS FOR TREATING HIGH ANTIMONY-
BEARING GOLD ORES
Robert W. Bruce, Ottawa, Ontario, Canada, assignor to Her Majesty The Queen in Right of Canada as represented by the Minister of Mines and Technical Surveys
No Drawing. Filed Apr. 29, 1963, Ser. No. 276,223
1 Claim. (Cl. 75—105)

This invention relates to a process for treating high antimony bearing gold ores. This application is a continuation-in-part of United States application Serial No. 106,447, filed May 1, 1961, now abandoned.

A well established method for treating refractory gold ores in which the gold is locked up inside fine sulphides is to treat the sulphide concentrate produced from the ore by an oxidizing roast, followed by cyanidation of the resulting calcine to recover the gold. Gold recoveries in the order of 95% are obtained by this method at a number of Canadian gold mines such as those in the Red Lake district of Ontario and in the Yellowknife district of Northwest Territories.

When appreciable amounts of antimony in the form of the minerals stibnite and/or berthierite are present in the flotation concentrates, the recovery of gold is lowered depending on the amount of antimony present. The higher the antimony content, the lower the gold recovery. Generally speaking, up to 1% antimony can be tolerated without appreciably affecting the gold recovery. However, when 10 to 15% Sb is present in the concentrates, the gold recovery is decreased from 20 to 40%.

An object of the present invention is to provide a process for treating high antimony bearing gold ores which results in a substantially increased gold recovery therefrom.

In accordance with the invention, a roasting charge of gold ore concentrates containing 2% to 20% antimony is treated by the addition of 3 to 15% common salt (sodium chloride, NaCl) to the charge during roasting.

Experiments have shown that the addition of, for instance, 10% salt to a flotation concentrate containing 13.3% Sb present as stibnite, results in a gold recovery from the cyanidation of the resulting calcine of 95 to 98%. When the same concentrate is roasted under identical conditions but without the addition of salt, the highest gold recovery obtained was 75%.

Addition of sodium chloride does not result in a true chloridizing roast for the following reasons:

(1) The charge to the furnace may be perfectly dry and no moisture is required to produce an atmosphere of chlorine gas during roasting as is recognized to be necessary in conventional chloridizing roasting. In fact, it is important that an oxidizing atmosphere be maintained by means of an excess of oxygen during the roasting operation.

(2) X-ray diffraction of the gases given off during the roasting step in the process of the present invention showed arsenopyrite and arsenious oxide ($As_4O_3$) to be present; no metal chlorides were detected. Moreover, no metal chlorides were detected in the final calcine.

(3) A necessary feature of chloridizing roasting as heretofore practiced is the complete transformation of metal-bearing minerals into their corresponding chlorides.

It has not been determined what exact role the salt plays in bringing about a marked increase in gold extraction under the circumstances outlined but it appears that the salt reacts with the stibnite or berthierite in such a way as to prevent its interference with the extraction of gold by cyanidation.

In one experiment, a sample of ore, which was similar in mineral composition to an ore containing a relatively high percentage of stibnite except that it contained only traces of stibnite, was obtained from the same mine. When a concentrate from this ore was roasted under similar conditions but without salt added, a recovery of gold from cyanidation of the calcine was 99.9%. When the same concentrate was roasted with 10% salt added, the gold recovery was 98.0%.

Thus, salt is beneficial in the treatment of this type of ore only when a substantial percentage of antimony is present in the form of stibnite or berthierite.

It will however be recognized that there is an upper limit of antimony content in the concentrates beyond which there would be no practical advantage in treatment thereof in accordance with the invention. This upper limit is approximately 20%.

The amount of salt employed will depend to some extent on the percentage of Sb present in the ore under treatment. This amount should be in the range of 3% to 15% by weight of the charge. Preferably, however, when a substantially large amount of Sb is present (8% to 15%) as stibnite and/or berthierite, the optimum amount of salt required is 10% by weight of the charge to the furnace.

The roasting can be done in a conventional hearth roaster or in the newer fluid bed reactor type of roaster. Experiments show that when using salt in a fluid bed roaster, gold extraction from cyanidation of the calcine was higher than obtained in a conventional hearth type roaster.

It will be apparent that maintenance of the oxidizing atmosphere throughout the roast is effected in usual manner by sweeping the charge with a forced draft of air which exhausts from the furnace the arsenious oxide or sulphur oxide as soon as evolved. This step is of course inherent in the fluid bed roaster in which a forced draft of air flows through the charge.

The gold-bearing sulphide concentrate containing 2% to 20% antimony is roasted with 3% to 15% by weight of sodium chloride at a temperature between about 475° C. and 500° C. for 1 to 2 hours or until the evolution of sulphur dioxide ($SO_2$) and arsenious oxide ($As_4O_3$) fumes has substantially ceased. It is important during this first stage of roasting that the temperature of the charge does not exceed 500° C., otherwise there is a danger that the stibnite and/or berthierite minerals will melt and blind the pores of the calcine and prevent the subsequent leaching of the gold out of the calcine during the cyanidation of the calcine.

The temperature of the charge is then raised to about 650° C. to 700° C. to oxidize most of the remaining metal sulphides to their respective oxides. The charge is maintained at this temperature for a few minutes and then cooled and the calcine is treated by the conventional cyanidation process to recover the gold.

The following tables give the results obtained from roasting flotation concentrates under various conditions. The flotation concentrate roasted in Tables 1 and 2 had a high antimony content. Table 1 shows the results using conventional roasting methods. Table 2 shows the results using similar conditions but with salt added.

Table 3 shows the results obtained when roasting a flotation concentrate which was similar in mineral content to that used in Tables 1 and 2, but with a low antimony content.

TABLE 1

*Charge to furnace*

[No salt added, flotation concentrate assaying]

| | |
|---|---|
| Au | oz./ton__ 9.67 |
| Fe | percent__ 29.9 |
| S | do____ 19.2 |
| As | do____ 8.6 |
| Sb | do____ 13.3 |

| Test No. | Calcine analysis | | | | Au Extraction from Cyanidation of Calcine, percent | Remarks |
|---|---|---|---|---|---|---|
| | Oz./ton Au | Percent | | | | |
| | | S | As | Sb | | |
| 1 | 12.63 | 0.77 | 1.58 | 8.00 | 59.6 | Hearth roast 2 stages, 500° C. and 650° C. |
| 2 | 13.05 | 0.71 | 1.35 | 10.1 | 64.4 | Do. |
| 3 | 13.25 | 0.67 | 1.35 | 7.5 | 53.1 | Hearth roast, 1 stage, 650° C. |
| 4 | 12.20 | 1.20 | 1.70 | 7.0 | 46.7 | Hearth roast, 1 stage, 500° C. |
| 5 | 12.55 | 0.97 | 1.95 | 11.4 | 71.5 | Hearth roast, 3 stages, 380° C., 500° C., 650° C. |
| 6 | 13.10 | 0.75 | 1.38 | 10.4 | 74.4 | Hearth roast, 2 stages, 480° C. and 650° C. |
| 7 | 10.26 | 1.12 | 2.83 | 8.3 | 75.0 | Fluid bed roast at 480° C. and 700° C. |

TABLE 2

*Charge to furnace*

[Salt added, flotation concentrate (same as in Table 1)]

| Test No. | Calcine analysis | | | | Au Extraction from Cyanidation of Calcine, percent | Remarks |
|---|---|---|---|---|---|---|
| | Oz./ton Au | Percent | | | | |
| | | S | As | Sb | | |
| 8 | 9.31 | 2.14 | 1.80 | 7.51 | 87.4 | Hearth roast 2 stages, 500° C. and 650° C., 20% salt added to charge. |
| 9 | 10.22 | 1.68 | 1.82 | 8.1 | 88.7 | Hearth roast 2 stages, 480° C. and 650° C., 15% salt added to charge. |
| 10 | 10.97 | 2.04 | 1.92 | 8.6 | 87.2 | Hearth roast, 2 stages, 480° C. and 650° C., 10% salt added to charge. |
| 11 | 10.32 | 2.98 | 3.98 | 9.5 | 85.8 | Hearth roast, 2 stages, 500° C. and 650° C., 10% salt added to charge. |
| 12 | 11.27 | 2.10 | 1.75 | 10.1 | 81.6 | Hearth roast, 2 stages, 500° C. and 650° C., 5% salt added to charge. |
| 13 | 8.52 | 1.08 | 1.23 | 7.4 | 94.7 | Fluid bed roast, 2 stages, 490° C. and 700° C., 20% salt added to charge. |
| 14 | 8.18 | 1.45 | 1.65 | 8.2 | 96.0 | Fluid bed roast, 2 stages, 490° C. and 700° C., 10% salt added to charge. |
| 15 | 10.42 | 1.10 | 1.20 | 7.8 | 98.5 | Do. |
| 16 | 11.55 | 1.87 | 0.97 | 4.3 | 95.7 | Fluid bed roast 3 stages, 490° C, 530° C., and 700° C., 10% salt added to charge. |

TABLE 3

*Charge to furnace*

| | |
|---|---|
| Au | oz./ton__ 19.14 |
| S | percent__ 22.91 |
| As | do____ 4.55 |
| Sb | do____ 0.18 |

[Flotation concentrate assaying]

| Test No. | Calcine analysis | | | | Au Extraction from Cyanidation of Calcine, percent | Remarks |
|---|---|---|---|---|---|---|
| | Oz./ton Au | Percent | | | | |
| | | S | As | Sb | | |
| 17 | 22.29 | 2.17 | 1.63 | 0.45 | 99.9 | Hearth roast, 2 stages, 485° C. and 650° C., No salt added. |
| 18 | 19.21 | 5.91 | 2.50 | 0.10 | 98.0 | Hearth roast, 2 stages, 485° C. and 650° C., 10% salt added to charge. |

I claim:

A process for treating high antimony bearing gold ores which comprises roasting in a roaster a charge consisting essentially of gold ore sulphide concentrates containing 2 to 20% antimony and 3 to 15% by weight of sodium chloride during an initial stage at a temperature of from about 475° C. to 500° C. until evolution of oxide fumes substantially ceases, and during a final stage at a temperature from about 650° C. to 700° C., sweeping said charge with air throughout said initial and final stages to provide an oxidizing atmosphere in said roaster throughout said stages and to exhaust from said roaster said oxide fumes immediately upon evolution thereof during said initial stage, cooling the roasted charge, and subjecting the resulting roasted charge to cyanidation to recover gold therefrom.

References Cited by the Examiner

UNITED STATES PATENTS 1,818,846  8/31  Giles _____ 75—83

FOREIGN PATENTS 21,395  1896  Great Britain.
635,904  4/50  Great Britain.
543,156  7/57  Canada.

BENJAMIN HENKIN, *Primary Examiner.*